(12) United States Patent
Kuboshima et al.

(10) Patent No.: US 10,522,266 B2
(45) Date of Patent: Dec. 31, 2019

(54) WIRE HARNESS, METHOD FOR TRANSPORTING WIRE HARNESS WITH DEVICE, AND METHOD FOR CONNECTING DEVICES WITH WIRE HARNESS

(75) Inventors: Hidehiko Kuboshima, Kosai (JP); Hideomi Adachi, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 79 days.

(21) Appl. No.: 13/809,662

(22) PCT Filed: Jul. 7, 2011

(86) PCT No.: PCT/JP2011/065620
§ 371 (c)(1),
(2), (4) Date: Jan. 11, 2013

(87) PCT Pub. No.: WO2012/008365
PCT Pub. Date: Jan. 19, 2012

(65) Prior Publication Data
US 2013/0105218 A1 May 2, 2013

(30) Foreign Application Priority Data
Jul. 12, 2010 (JP) .................................. 2010-157450

(51) Int. Cl.
*H01B 7/00* (2006.01)
*B60R 16/02* (2006.01)
*H02G 3/04* (2006.01)

(52) U.S. Cl.
CPC ........... *H01B 7/00* (2013.01); *B60R 16/0215* (2013.01); *H02G 3/0437* (2013.01); *Y10T 29/49117* (2015.01)

(58) Field of Classification Search
None
See application file for complete search history.

(56) References Cited

U.S. PATENT DOCUMENTS 4,751,614 A * 6/1988 Mehnert .................. H01B 7/08
174/106 SC
5,170,535 A * 12/1992 Strong ...................... B42F 1/08
24/547

(Continued)

FOREIGN PATENT DOCUMENTS

CN  201174267 Y  12/2008
CN  101448681 A   6/2009

(Continued)

OTHER PUBLICATIONS

Bob Catanzarite, Structured Wiring, Jul. 28, 2008 (Year: 2008).*

(Continued)

*Primary Examiner* — Binh B Tran
*Assistant Examiner* — Douglas R Burtner
(74) *Attorney, Agent, or Firm* — Sughrue Mion, PLLC

(57) ABSTRACT

When bus bars are covered with covering parts and high-voltage conducting paths are formed and further the ends of the high-voltage conducting paths are provided with a motor side connector and an inverter side connector, formation of a wire harness is completed. Since the wire harness has a shape holding part, the whole bus bar is not a rigid body. The wire harness has plasticity. Since the shape holding part holds the shape at a point in time of stopping a bend process, the wire harness can be formed in a desired bend shape.

9 Claims, 14 Drawing Sheets

(56) References Cited

U.S. PATENT DOCUMENTS

| | | | |
|---|---|---|---|
| 6,177,635 B1 | 1/2001 | Sugiura et al. | |
| 7,114,971 B1* | 10/2006 | Johnson | H01R 13/112 439/211 |
| 2002/0159467 A1* | 10/2002 | Kirshenboim | H04L 12/6418 370/410 |
| 2006/0254801 A1* | 11/2006 | Stevens | H01B 11/1008 174/102 R |
| 2006/0278423 A1* | 12/2006 | Ichikawa | B60R 16/0215 174/72 A |
| 2007/0047218 A1* | 3/2007 | Hsieh | A61L 9/22 362/92 |
| 2008/0238809 A1* | 10/2008 | Mtchedlishvili | H01Q 1/241 343/906 |
| 2008/0245201 A1* | 10/2008 | Darzi | B21D 45/003 83/24 |
| 2009/0104514 A1* | 4/2009 | Lietz | H01B 7/08 429/121 |
| 2010/0045106 A1* | 2/2010 | Oga | B60R 16/0215 307/10.1 |
| 2011/0088944 A1* | 4/2011 | Ogue | B60R 16/0215 174/72 A |
| 2011/0200289 A1* | 8/2011 | Sorimachi | H01B 7/041 385/101 |
| 2012/0244746 A1* | 9/2012 | Tsuge | H01R 13/631 439/571 |
| 2013/0105218 A1* | 5/2013 | Kuboshima | B60R 16/0215 174/72 A |
| 2013/0112473 A1* | 5/2013 | Toyama | B60R 16/0215 174/350 |
| 2013/0264114 A1* | 10/2013 | Toyama | B60R 16/0207 174/72 A |
| 2014/0102783 A1* | 4/2014 | Nagahashi | H01B 7/0823 174/72 A |

FOREIGN PATENT DOCUMENTS

| | | |
|---|---|---|
| DE | 4210202 A1 | 9/1993 |
| DE | 102005054926 A1 | 6/2006 |
| DE | 102006050705 A1 | 4/2008 |
| JP | 63128626 U | 8/1988 |
| JP | 1307109 A | 12/1989 |
| JP | 294211 A | 4/1990 |
| JP | 3-101008 A | 4/1991 |
| JP | 2000133051 A | 5/2000 |
| JP | 2000207944 A | 7/2000 |
| JP | 200749784 A | 2/2007 |
| JP | 200766825 A | 3/2007 |
| JP | 2007-330044 A | 12/2007 |
| JP | 2008253017 A | 10/2008 |
| JP | 2009143326 A | 7/2009 |

OTHER PUBLICATIONS

Copper—The Best Buy in Building Wire Jan. 5, 2009 Copper.org (Year: 2009).*
Copper conductor Jul. 10, 2019 Wikipedia.org (Year: 2019).*
Flexible Power Cable May 15, 2012 coonerwire.com (Year: 2012).*
Office Action, Issued by the State Intellectual Property Office of P.R. China, dated Sep. 3, 2014, In counterpart Chinese Application No. 201180034663.X.
International Search Report dated Oct. 11, 2011 issued by the International Searching Authority in counterpart International Application No. PCT/JP2011/065620.
Written Opinion (PCT/ISA/237) dated Oct. 11, 2011 issued by the International Searching Authority in counterpart International Application No. PCT/JP2011/065620.
Communication dated Jan. 6, 2015 by the Japanese Patent Office in related application No. 2010157450.
Communication from the State Intellectual Property Office of P.R. China dated Apr. 28, 2015 in a counterpart application No. 201180034663.X.
Office Action dated Sep. 29, 2015, issued by the Japanese Patent Office in counterpart Japanese Patent Application No. 2010-157450.
Office Action dated Nov. 3, 2015 issued by the State Intellectual Property Office of the People's Republic of China in counterpart Chinese Patent Application No. 201180034663.X.
Office Action dated Apr. 21, 2016, issued by the State Intellectual Property Office of P.R. China in counterpart Chinese Application No. 201180034663.X.
Office Action dated Nov. 10, 2016 issued by the State Intellectual Property Office of P.R. China in Chinese Patent Application No. 201180034663.X.
Office Action dated Mar. 10, 2017 issued by the State Intellectual Property Office of P.R. China in counterpart Chinese Patent Application No. 201180034663.X.
Communication dated Oct. 14, 2016, from the European Patent Office in counterpart European Application No. 11806695.0.
Communication issued by the State Intellectual Property Office of P.R. China on Feb. 2, 2018 in counterpart Chinese Patent Application No. 201180034663.X.
Yuesheng Liu, et al., "Chapter V, Power Supply for Electronic Devices", Hebei People's Press, Dec. 31, 1981, pp. 279-285. (8 pages total).
Yuesheng Liu, et al., "Chapter V, Power Supply for Electronic Devices", Hebei People's Press, Dec. 31, 1981, p. 281. (1 page total).
Office Action dated May 31, 2018 by the State Intellectual Property Office of P.R. China in counterpart Chinese Patent Application No. 201180034663.X.

* cited by examiner

WIRE HARNESS, METHOD FOR TRANSPORTING WIRE HARNESS WITH DEVICE, AND METHOD FOR CONNECTING DEVICES WITH WIRE HARNESS

TECHNICAL FIELD

The present invention relates to a wire harness using a bus bar as a conductor. Also, the invention relates to a method for transporting the wire harness with a device. Further, the invention relates to a method for connecting a device with wire harness.

BACKGROUND ART

An electric vehicle or a hybrid vehicle includes a motor used as a power source, an inverter for generating a three-phase AC necessary for driving of the motor, and a wire harness for making connection between the motor and the inverter.

A wire harness disclosed in Patent Reference 1 includes a harness body having plural high-voltage electric wires, a motor side connection formed on one end of the harness body and used as a connection portion of a motor, and an inverter side connection formed on the other end of the harness body and used as a connection portion of an inverter. Also, in the wire harness disclosed in Patent Reference 1, the harness body is formed relatively long.

Incidentally, a process in which a wire harness is connected to a motor and an inverter after manufacture of the wire harness will be described briefly. First, the wire harness is transported to a motor manufacturing step. Next, the transported wire harness is connected to the motor in the motor manufacturing step. Then, the wire harness connected to the motor is transported to a vehicle assembly step together with the motor. In the transported motor and the wire harness, the motor is first fixed in a predetermined position in the vehicle assembly step and the inverter is then fixed in a predetermined position corresponding to the motor. Then, when the wire harness is finally connected to the inverter, the motor and the inverter are connected by the wire harness.

RELATED ART REFERENCE

Patent Reference

Patent Reference 1: JP-A-2008-253017

DISCLOSURE OF THE INVENTION

Problems that the Invention is to Solve

The wire harness connected to the motor may be transported in a state that the wire harness is fixed to the motor and is not moved easily in order to prevent an obstacle in the case of transportation, and also in order to prevent an influence on securing of space in the case of transportation, and further in order to prevent damage from a situation in which the other end of the wire harness (the inverter side connection connected to the inverter later) hits some substance in the case of transportation. In this case, the motor manufacturing step side has a problem of requiring the number of work man-hours related to fixing of the wire harness. Also, the vehicle assembly step side has a problem of requiring the number of work man-hours related to unfixing of the wire harness before the wire harness is connected to the inverter.

The invention has been implemented in view of the circumstances described above, and a problem of the invention is to provide a wire harness capable of reducing the number of work man-hours in the case of transportation or connection, a method for transporting the wire harness with a device, and a method for connecting devices with a wire harness.

Means for Solving the Problems

The above problem of the invention is solved by configurations of the following (1) to (3).

(1) A wire harness having a shape holding part which has bendable flexibility and enables to hold a shape in any bend state.

(2) In the wire harness with the configuration of the above (1), the shape holding part is integrally formed to a conductor in a conducting path or the shape holding part is arranged along the conducting path.

(3) In the wire harness with the configuration of the above (1) or (2), a material of the shape holding part is aluminum or aluminum alloy.

Also, the above problem of the invention is solved by a configuration of the following (4).

(4) A method for transporting a wire harness and a device, including a step of arranging the wire harness along the device by bending the wire harness at a position of a shape holding part in a case of transporting the wire harness having the shape holding part and the device to which one end of the wire harness is connected, wherein the shape holding part has bendable flexibility and enables to hold a shape in any bend state.

Also, the above problem of the invention is solved by a configuration of the following (5).

(5) A method for connecting devices with a wire harness, including a first step of providing the wire harness having a shape holding part which has bendable flexibility and enables to hold a shape in any bend state and connecting one end of the wire harness to a first device;

a second step of bending the wire harness in a position of the shape holding part and moving the other end of the wire harness in a desired retracted position; and a third step of installing a second device in a position corresponding to the first device, then bending the wire harness in the position of the shape holding part to move the other end of the wire harness toward the second device, and connecting the other end to the second device.

(6) In the method for connection the devices with the wire harness with the configuration of the above (5), the method for transporting the wire harness with the device as described in the above (4) is adopted between the first step and the second step.

According to the wire harness with the configuration of the above (1), since the wire harness has the shape holding part, the wire harness can be bent in the position of the shape holding part. Also, since the shape holding part can hold the shape at a point in time of stopping the bend process, the wire harness can be formed in a desired bend shape. Also, the wire harness having plasticity can be obtained by forming the wire harness having the shape holding part. Consequently, there is an effect capable of providing the wire harness capable of reducing the number of work man-hours in the case of transportation or connection.

According to the wire harness with the configuration of the above (2), the shape holding part is formed in the conductor of the conducting path constructing the wire harness, so that the conducting path itself can be bent in a position of the shape holding part. Consequently, there is an effect capable of providing the good wire harness. Also, since the shape holding part is arranged along the conducting path constructing the wire harness, the conducting path can be bent in a position of the shape holding part. Consequently, there is an effect capable of providing the good wire harness.

According to the wire harness with the configuration of the above (3), aluminum or aluminum alloy can be given as one example of a suitable material of the shape holding part. Since aluminum or aluminum alloy is softer than general conductive materials such as copper, there are effects capable of improving bendability and also reducing weight.

According to the method for transporting the wire harness with the device with the configuration of the above (4), the wire harness which is connected to the device and is transported together with the device is formed so as to have the shape holding part, so that the wire harness could be bent and set in a state along the device in a position of the shape holding part in the case of transportation, and there is an effect capable of stabilizing arrangement of the wire harness without forming a special fixing member. Hence, there is an effect capable of reducing the number of work man-hours in the case of transportation.

According to the method for connecting devices with a wire harness with the configuration of the above (5), the wire harness used in connection between the first device and the second device is formed so as to have the shape holding part, so that the wire harness itself can be bent in a position of the shape holding part. Since the shape holding part holds the shape at a point in time of stopping the bend process, the wire harness can be formed in a desired bend shape. Also, for example, after the wire harness is connected to the first device, the wire harness can be bent in a position with no problem in installing the second device. Since the wire harness has plasticity, it is unnecessary for a worker to continue to hold the wire harness by hand and do work, or to fix the wire harness for temporary holding, and it is also unnecessary to use a dedicated holding jig. Consequently, there is an effect capable of reducing the number of work man-hours in the case of connection.

According to the method for connecting the devices with the wire harness with the configuration of the above (6), after one end of the wire harness is connected to the first device in the first step, the wire harness can be transported together with the first device, and there is an effect capable of doing work in the second step or later in a transportation destination.

MODE FOR CARRYING OUT THE INVENTION

A conductor constructing a conducting path of a wire harness according to one embodiment of the invention is formed by a bus bar. A shape holding part which has bendable flexibility and can hold a shape in any bend state is formed in the bus bar.

Embodiment

One embodiment of the invention will hereinafter be described with reference to the drawings.

A wire harness arranged in a hybrid vehicle or an electric vehicle is targeted for a wire harness of the present embodiment. Hereinafter, an example in the hybrid vehicle shall be given and described. (For the electric vehicle, a configuration, a structure and an effect of the wire harness of the invention are basically the same. In addition, the invention is not limited to the hybrid vehicle or the electric vehicle, and can also be applied to typical vehicles etc.)

Figure 1:
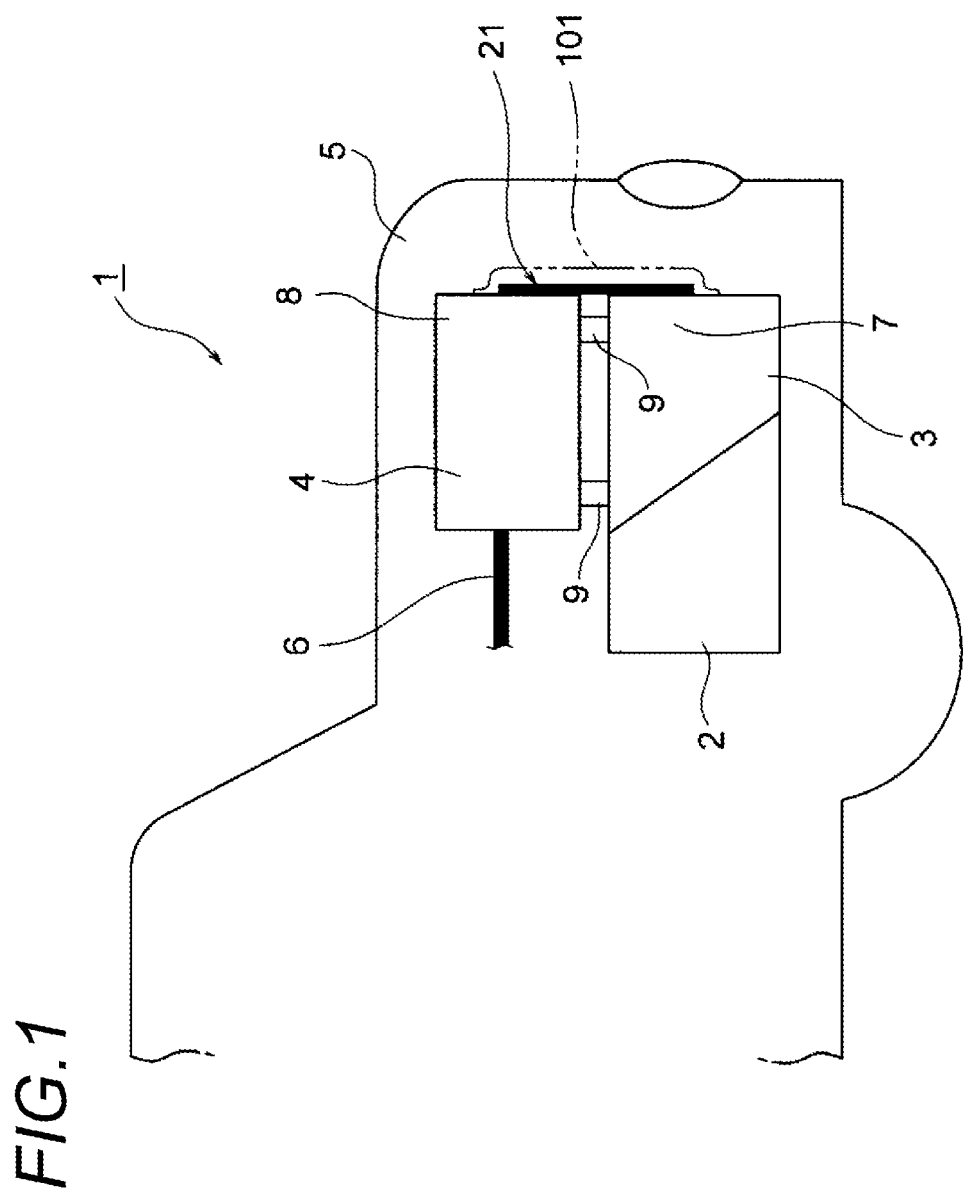
FIG. 1 is a schematic diagram showing an installing example of a wire harness according to one embodiment of the invention.

In FIG. 1, reference numeral 1 shows a hybrid vehicle. The hybrid vehicle 1 is a vehicle driven by mixing two powers of an engine 2 and a motor unit 3, and is constructed so that electric power from a battery (a battery pack) (not shown) is supplied to the motor unit 3 through an inverter unit 4. The engine 2, the motor unit 3 and the inverter unit 4 are installed in an engine room 5 of a position having front wheels etc. in the embodiment. Also, the battery (not shown) is installed inside a room of the vehicle present in the rear of the engine room 5, or in a vehicle rear part having rear wheels etc.

The inverter unit 4 is connected to the motor unit 3 by a wire harness 21 for high voltage of the embodiment. Also, the inverter unit 4 is connected to the battery (not shown) by a wire harness 6 for high voltage. The wire harness 6 is arranged over an underfloor part of the ground side of, for example, a floor panel from the engine room 5.

Supplemental explanation of the embodiment is given herein. The motor unit 3 includes a motor and a generator. Also, the inverter unit 4 includes an inverter and a converter. The motor unit 3 is formed as a motor assembly including a shield case 7. Also, the inverter unit 4 is formed as an inverter assembly including a shield case 8. The battery (not shown) is a battery of a Ni-MH system or a Li-ion system, and is formed by modularization. In addition, an electric storage device such as a capacitor can be used. The battery (not shown) is not particularly limited as long as the battery can be used in the hybrid vehicle 1 or the electric vehicle.

The motor unit 3 corresponds to a device and a first device according to the invention. Also, the inverter unit 4 corresponds to a second device according to the invention. The inverter unit 4 is arranged and fixed just over the motor unit 3 in the embodiment. Reference numeral 9 shows fixing legs for arranging and fixing the inverter unit 4 just over the motor unit 3.

Substantially the whole wire harness 21 of the embodiment is covered with a conductive shield cover 101 in a state that the inverter unit 4 is electrically connected to the motor unit 3 (see FIGS. 1 to 4). The shield cover 101 is fixed astride the shield case 7 of the motor unit 3 and the shield case 8 of the inverter unit 4 and is formed so that an electromagnetic shielding function can be performed with respect to the wire harness 21. In addition, use of the shield cover 101 is shown as one example. That is, as long as the electromagnetic shielding function can be performed, a shielding member constructed of a braid or a shielding member constructed of metal foil (or a shielding member including the metal foil) may be used.

First, a configuration, a structure and formation of the wire harness 21 of the embodiment will be described.

Figure 2:
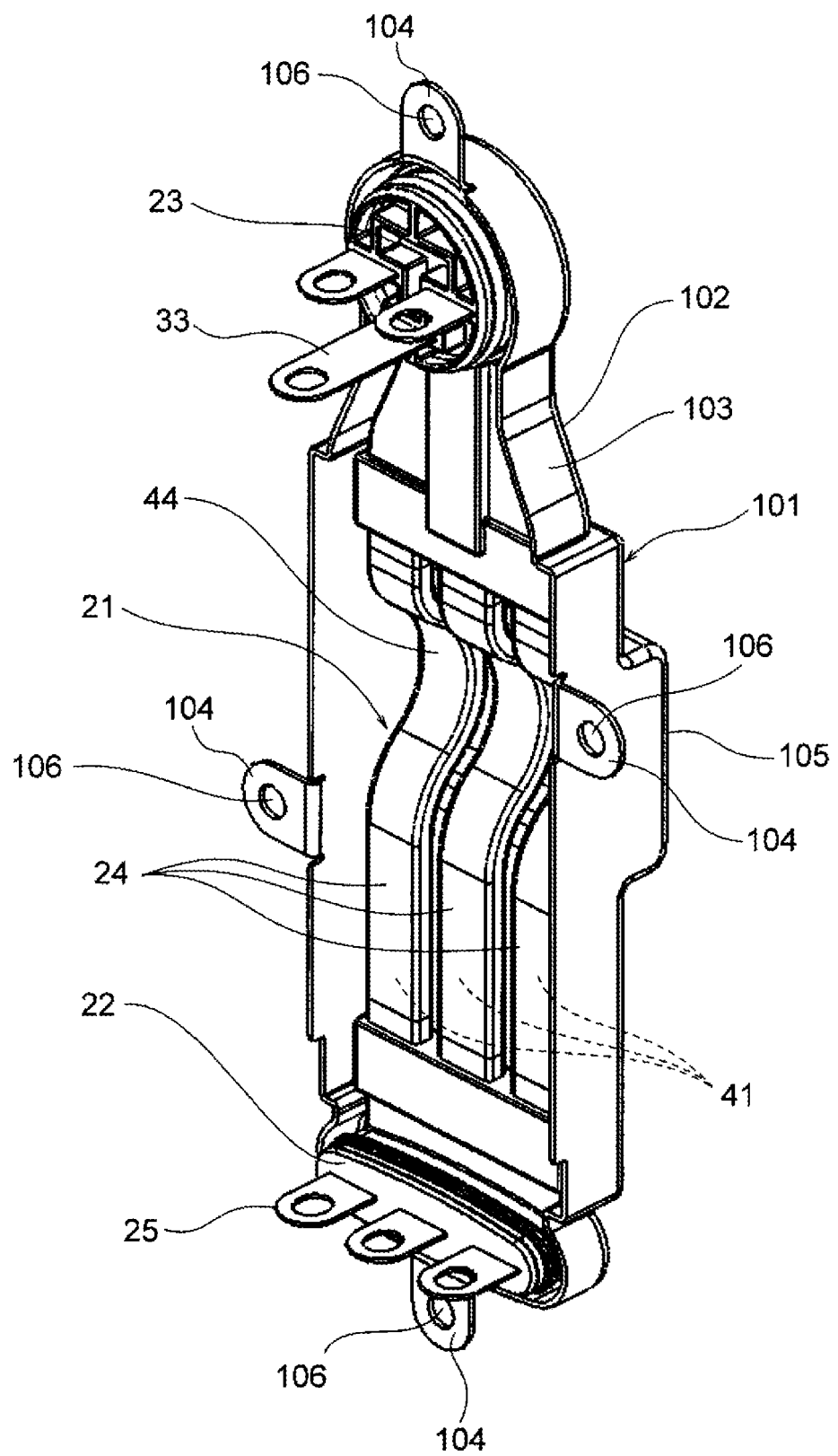
FIG. 2 is a perspective view (perspective view from the wire harness side) showing a state that the wire harness according to one embodiment of the invention is covered with a shield cover.
Figure 4:
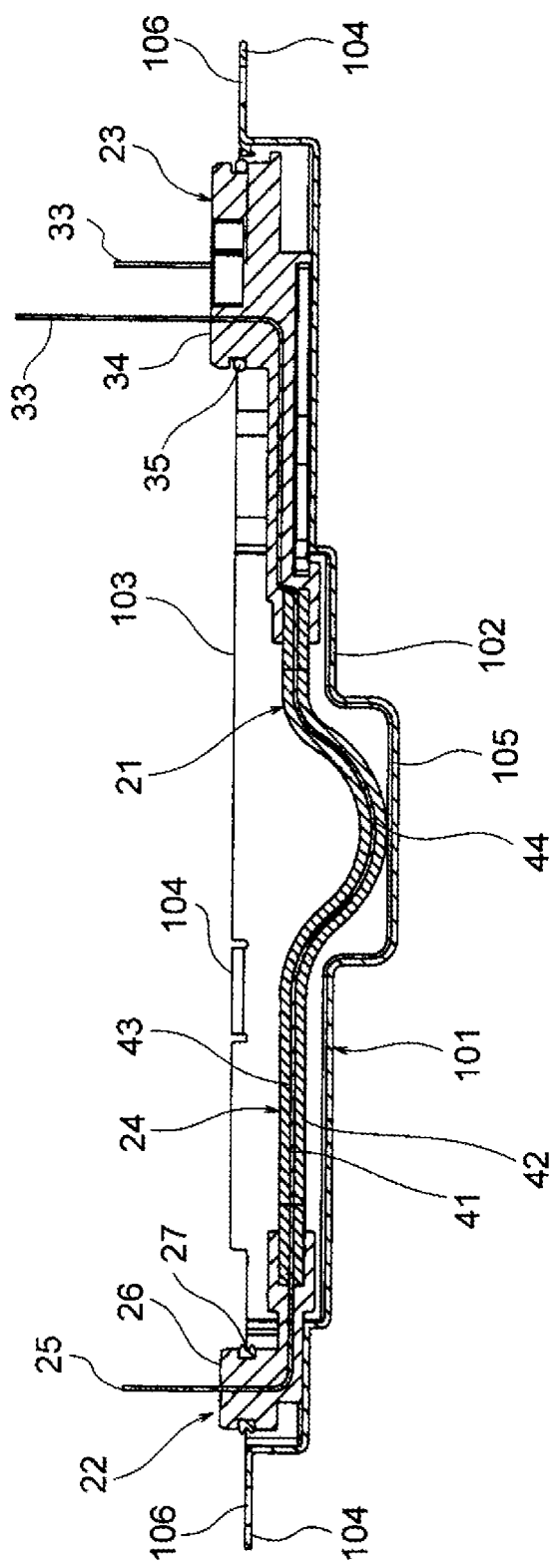
FIG. 4 is a sectional view showing a state that the wire harness according to one embodiment of the invention is covered with the shield cover.

In FIGS. 2 and 4, the wire harness 21 includes a motor side connector 22, an inverter side connector 23, and three high-voltage conducting paths 24 (conducting paths) for making connection between these connectors. The wire harness 21 can be formed in a desired bend shape by a configuration and a structure of the high-voltage conducting paths 24 described below. Each configuration mentioned above will hereinafter be described.

Figure 5:
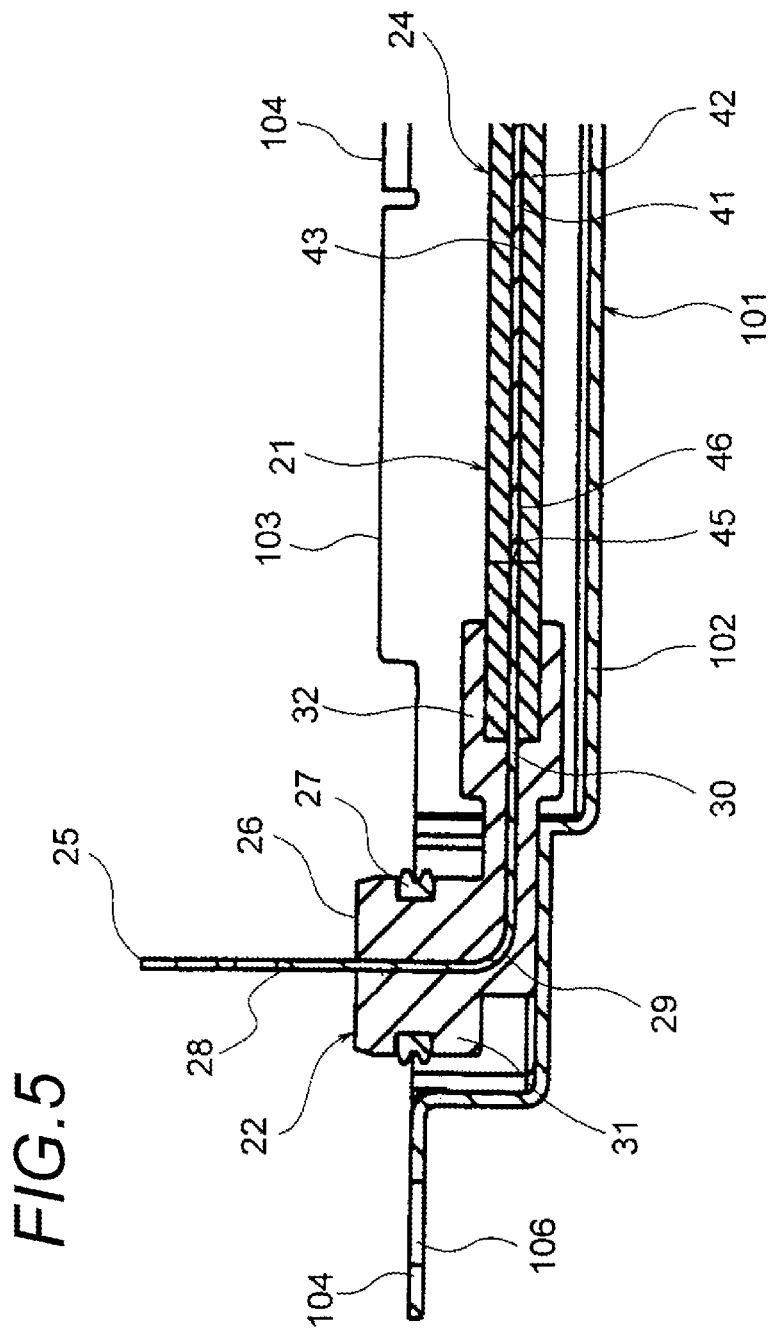
FIG. 5 is an enlarged sectional view of a motor side connector portion of FIG. 4.
Figure 6:
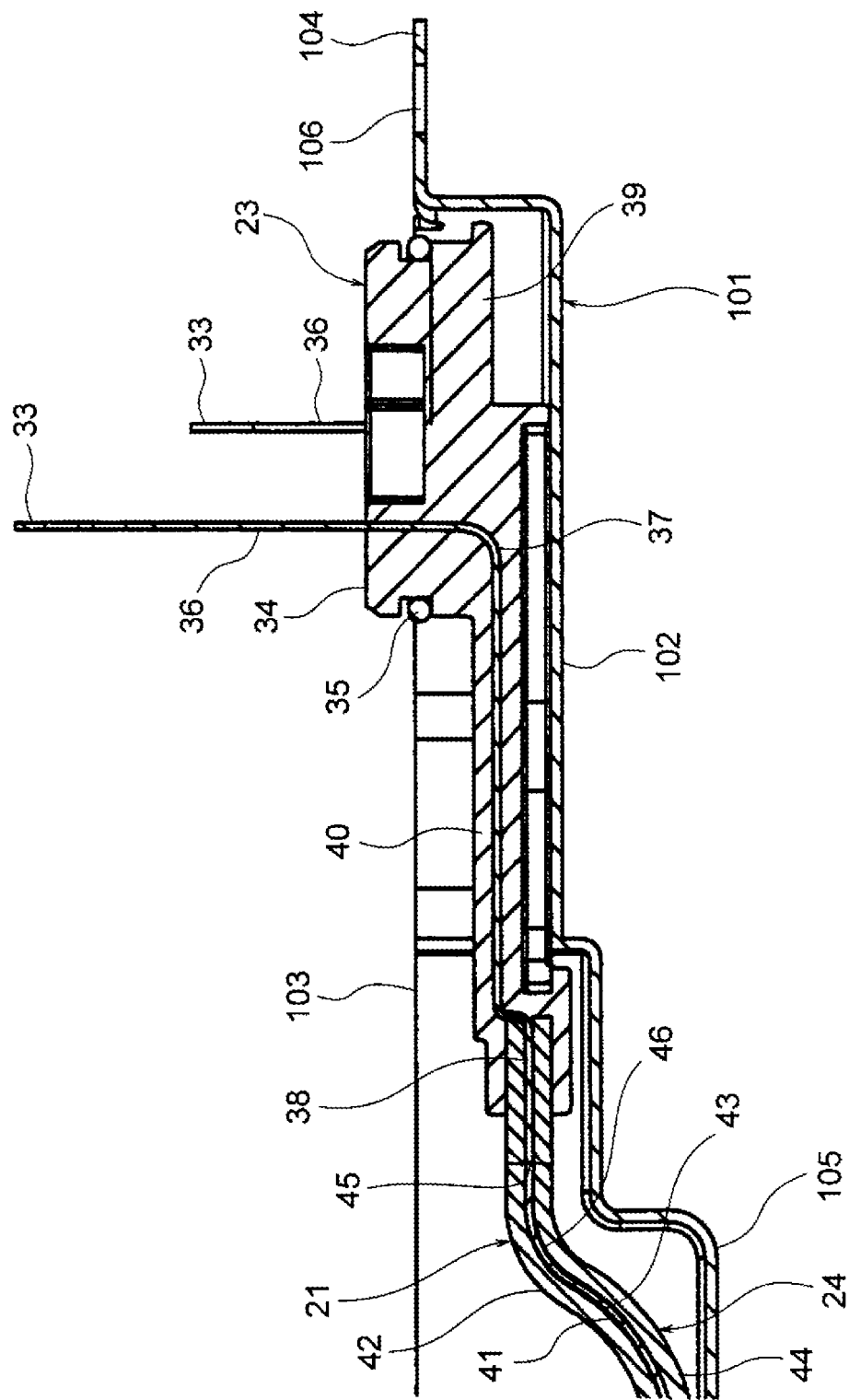
FIG. 6 is an enlarged sectional view of an inverter side connector portion of FIG. 4.

In FIGS. 4 to 6, the motor side connector 22 is integrally formed in a position of each one end of the conducting paths 24 in a situation in which each one end of the three high-voltage conducting paths 24 is arranged in line laterally. The motor side connector 22 is formed so as to extend through the shield case 7 (see FIG. 1) of the motor unit 3 and function as a connection for making electrical connection inside the shield case 7. The motor side connector 22 includes three terminal parts 25 having conductivity, a housing part 26 having insulation properties, and a packing member 27 having elasticity.

The terminal part 25 has a bus bar shape formed by pressing a metal plate made of copper or copper alloy, and has a terminal body 28, a folded part 29, and a conductor joint part 30 continuous with the folded part 29. The terminal part 25 is formed in substantially an L shape of arrangement in which the terminal body 28 is substantially orthogonal to the conductor joint part 30. The terminal body 28 is formed so as to suit a form of electrical connection to the motor unit 3 (see FIG. 1). In addition, a material of the terminal part 25 is not limited to copper etc. as long as a function as a terminal can be performed. Also, the terminal part 25 may be integrally formed to a bus bar 41 described below. That is, the terminal part 25 may be configured to be continuous with the end (one end) of the bus bar 41.

The housing part 26 is molded using a synthetic resin material having insulation properties. In the embodiment, a part of the terminal part 25 is formed by molding and also each one end of the three high-voltage conducting paths 24 is formed by molding and the housing part 26 is formed in the illustrated shape (formation by molding is shown as one example). The housing part 26 has a housing body 31 capable of being assembled to the shield case 7 (see FIG. 1) of the motor unit 3, and a body continuous part 32 continuous with the housing body 31, the body continuous part 32 with which the conductor joint part 30 is collectively covered. The packing member 27 is assembled in a predetermined position of the housing body 31.

The inverter side connector 23 is integrally formed in a position of each of the other ends of the conducting paths 24 in a situation in which each of the other ends of the three high-voltage conducting paths 24 is gathered. The inverter side connector 23 is formed so as to extend through the shield case 8 (see FIG. 1) of the inverter unit 4 and function as a connection for making electrical connection inside the shield case 8. The inverter side connector 23 includes three terminal parts 33 having conductivity, a housing part 34 having insulation properties, and a packing member 35 having elasticity.

The terminal part 33 has a bus bar shape formed by pressing a metal plate made of copper or copper alloy like the terminal part 25, and has a terminal body 36, a folded part 37, and a conductor joint part 38 continuous with the folded part 37. The terminal part 33 is formed in substantially an L shape of arrangement in which the terminal body 36 is substantially orthogonal to the conductor joint part 38. The terminal body 36 is formed so as to suit a form of electrical connection to the inverter unit 4 (see FIG. 1). In addition, a material of the terminal part 33 is not limited to copper etc. as long as a function as a terminal can be performed. Also, the terminal part 33 may be integrally formed to the bus bar 41 described below. That is, the terminal part 33 may be configured to be continuous with the end (the other end) of the bus bar 41.

The housing part 34 is molded using a synthetic resin material having insulation properties like the housing part 26. In the embodiment, a part of the terminal part 33 is formed by molding and also each of the other ends of the three high-voltage conducting paths 24 is formed by molding and the housing part 34 is formed in the illustrated shape (formation by molding is shown as one example). The housing part 34 has a housing body 39 capable of being assembled to the shield case 8 (see FIG. 1) of the inverter unit 4, and a body continuous part 40 continuous with the housing body 39, the body continuous part 40 with which each of the conductor joint parts 38 is covered. The packing member 35 is assembled in a predetermined position of the housing body 39.

The high-voltage conducting path 24 includes the bus bar 41 as a conductor, and a covering part 42 (cover) with which the bus bar 41 is covered. The high-voltage conducting path 24 is characterized in that a shape holding part 43 which has bendable flexibility and can hold a shape in any bend state is formed in the bus bar 41. In addition, the conductor described above is not limited to the bus bar 41 as long as the high-voltage conducting path 24 can have the shape holding part 43. The conductor may be made of copper, copper alloy or aluminum, and has a conductor structure formed by twisting strands or bar-shaped conductor structure with a rectangular or circular cross section (for example, a conductor structure with a rectangular or circular single core), and may have any of the conductor structures.

A curved part 44 curved in a semicircular arc shape is formed in the high-voltage conducting path 24 of the embodiment. The curved part 44 is arranged and formed in the middle of a longitudinal direction of the high-voltage conducting path 24. The curved part 44 is formed as the portion for reducing a positional deviation or a dimension error in the longitudinal direction related to electrical connection to the motor unit 3 and the inverter unit 4 (see FIG. 1) and also as the portion for making contact with the shield cover 101 and increasing a heat dissipation effect.

Figure 7:
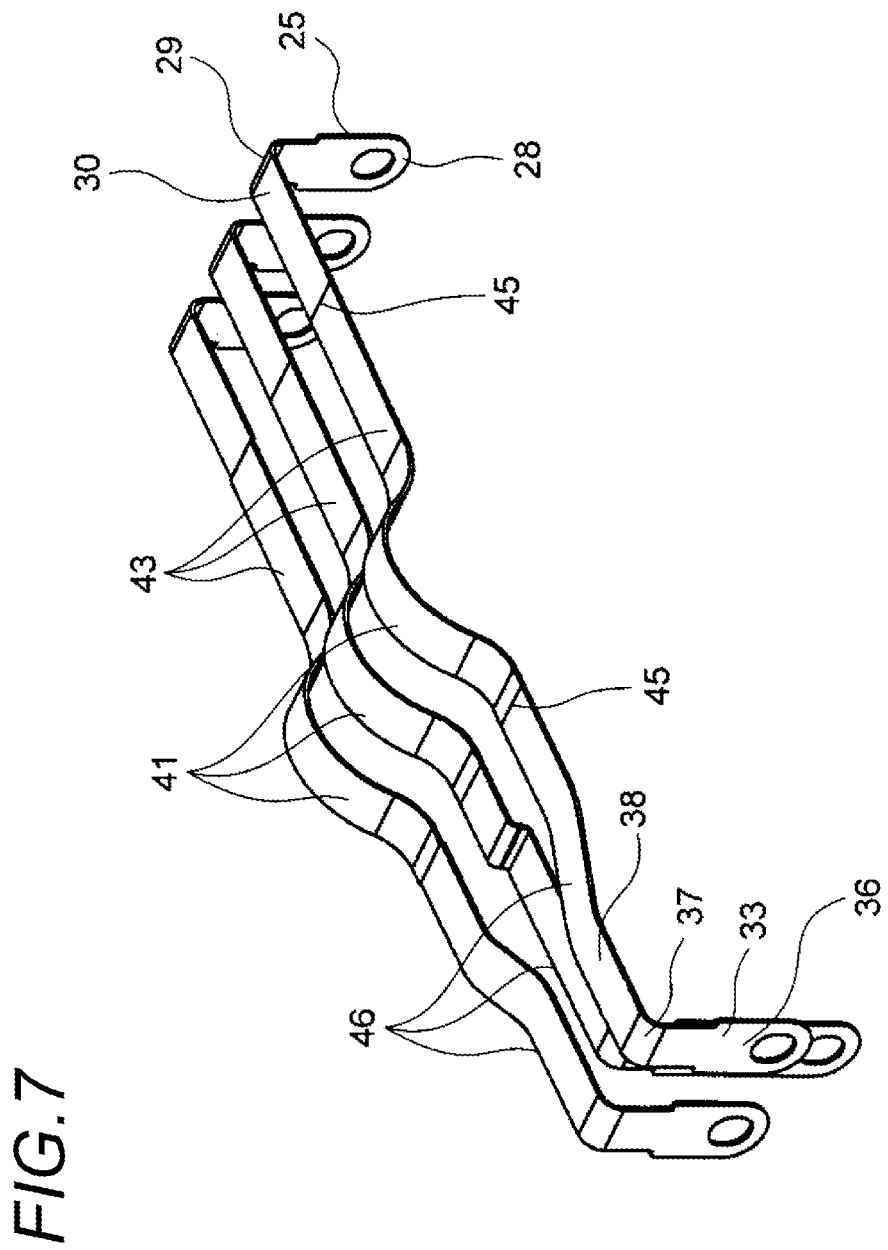
FIG. 7 is a perspective view of a bus bar as a conductor.

In FIG. 7, the whole bus bar 41 is formed as the shape holding part 43. That is, the whole bus bar 41 is formed so as to have bendable flexibility and be able to hold the shape in any bend state (be plastically deformed). In addition, the bus bar 41 may have a form in which a part of the bus bar 41 is formed as the shape holding part 43 and the other part is formed as a rigid part.

As a suitable material of the shape holding part 43, aluminum or aluminum alloy is given as one example. Consequently, the bus bar 41 of the embodiment is formed by pressing a metal plate made of aluminum or aluminum alloy in a bus bar shape. (The material is shown as one example. The material is not particularly limited as long as bendable flexibility is had and the shape can be held in any bend state and also the material is suitable as a conductor for high voltage.)

One end of the bus bar 41 is connected and fixed to the conductor joint part 30 in the terminal part 25. Also, the other end of the bus bar 41 is connected and fixed to the conductor joint part 38 in the terminal part 33. As one example suitable for connection and fixing, welding is given. (The example is not limited to the welding as long as electrical connection is made and also disconnection is not made in normal use.) Reference numeral 45 in FIG. 7 shows a welded portion.

Figure 8:
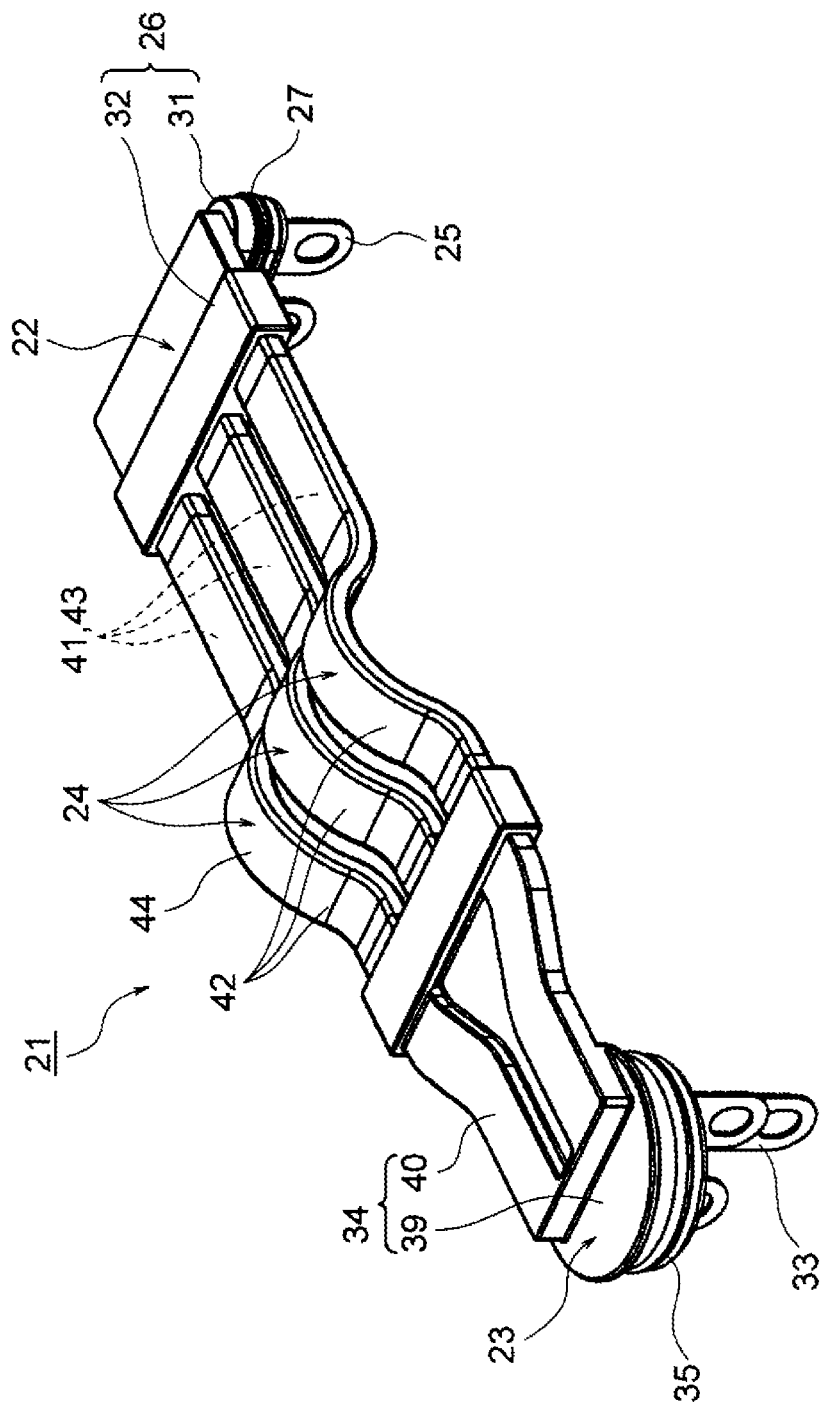
FIG. 8 is a perspective view of the wire harness according to one embodiment of the invention.

In the configuration and the structure described above, one end of the bus bar 41 is provided with the terminal part 25 and also the other end of the bus bar 41 is provided with the terminal part 33 as shown in FIG. 7. Then, after such three conductors 46 are arranged in substantially the same plane, the conductors 46 are covered with covering parts 42 and accordingly the high-voltage conducting paths 24 are formed as shown in FIG. 8. Further, when the motor side connector 22 and the inverter side connector 23 are formed in each of the ends of the high-voltage conducting paths 24, formation of the wire harness 21 is completed. Or, when the bus bars 41 are covered with the covering parts 42 and also predetermined bending work is done and thereafter both ends are formed by molding etc. and the motor side connector 22 and the inverter side connector 23 are formed, formation of the wire harness 21 is completed.

Since the wire harness 21 has the shape holding part 43, the whole bus bar 41 as the conductor is not a rigid body. The wire harness 21 has plasticity (elasticity). Since the shape holding part 43 holds the shape at a point in time of stopping a bend process, the wire harness 21 can be formed in a desired bend shape.

Figure 3:
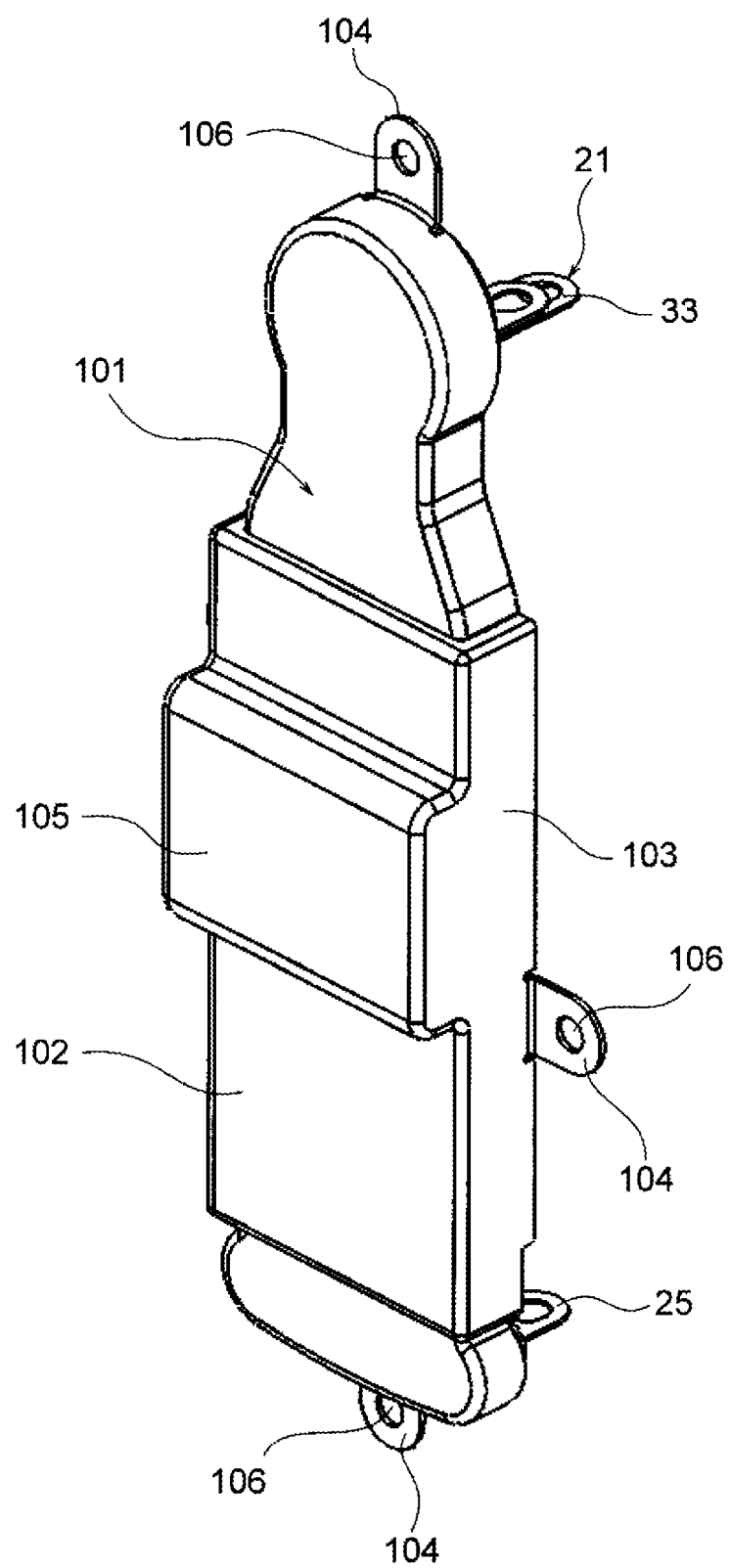
FIG. 3 is a perspective view (perspective view from the shield cover side) showing a state that the wire harness according to one embodiment of the invention is covered with the shield cover.

Next, a configuration, a structure and formation of the shield cover 101 will be described with reference to FIGS. 2 to 4.

The shield cover 101 is a conductive member capable of performing an electromagnetic shielding function with respect to the wire harness 21, and has a roof wall 102, a side wall 103 coupled to the peripheral edge of the roof wall 102 and plural fixing parts 104 coupled in predetermined positions of the side wall 103 in the embodiment, and is formed in an illustrated box shape.

A protrusion 105 is formed on the roof wall 102. The protrusion 105 is formed so that a part of the roof wall 102 projects when viewed from the outside (formed so as to become a recess when viewed from the inside). An inner surface of the protrusion 105 is formed as the portion of contact with the curved part 44 of the wire harness 21. When the curved part 44 makes contact with the inner surface of the protrusion 105, heat generated in the wire harness 21 can be absorbed. The heat absorbed through the protrusion 105 is dissipated over substantially the whole shield cover 101.

The fixing part 104 is the portion screwed and fixed to the shield case 7 of the motor unit 3 or the shield case 8 of the inverter unit 4 (see FIG. 1), and is formed in a tongue piece shape having a screw hole 106.

The shield cover 101 is formed by drawing a metal plate having conductivity or by punching and folding the metal plate. In addition, the shield cover 101 of the embodiment has a structure made of one component, but is not limited to this structure and may have, for example, a divided structure made of two components.

The shield cover 101 of the embodiment is a component formed separately from the wire harness 21, or a component formed so that the wire harness 21 after arranged in a predetermined position can be covered, and in the case of being changed to a shielding member constructed of a braid or a shielding member constructed of metal foil (or a shielding member including the metal foil) as described above, the shielding members are included in a component of the wire harness 21.

Subsequently, for example, connection between the motor unit 3 and the inverter unit 4 by the wire harness 21 will be described with reference to FIGS. 9 to 14. In addition, explanation herein mentions transportation of the wire harness 21 and the motor unit 3.

Figure 9:
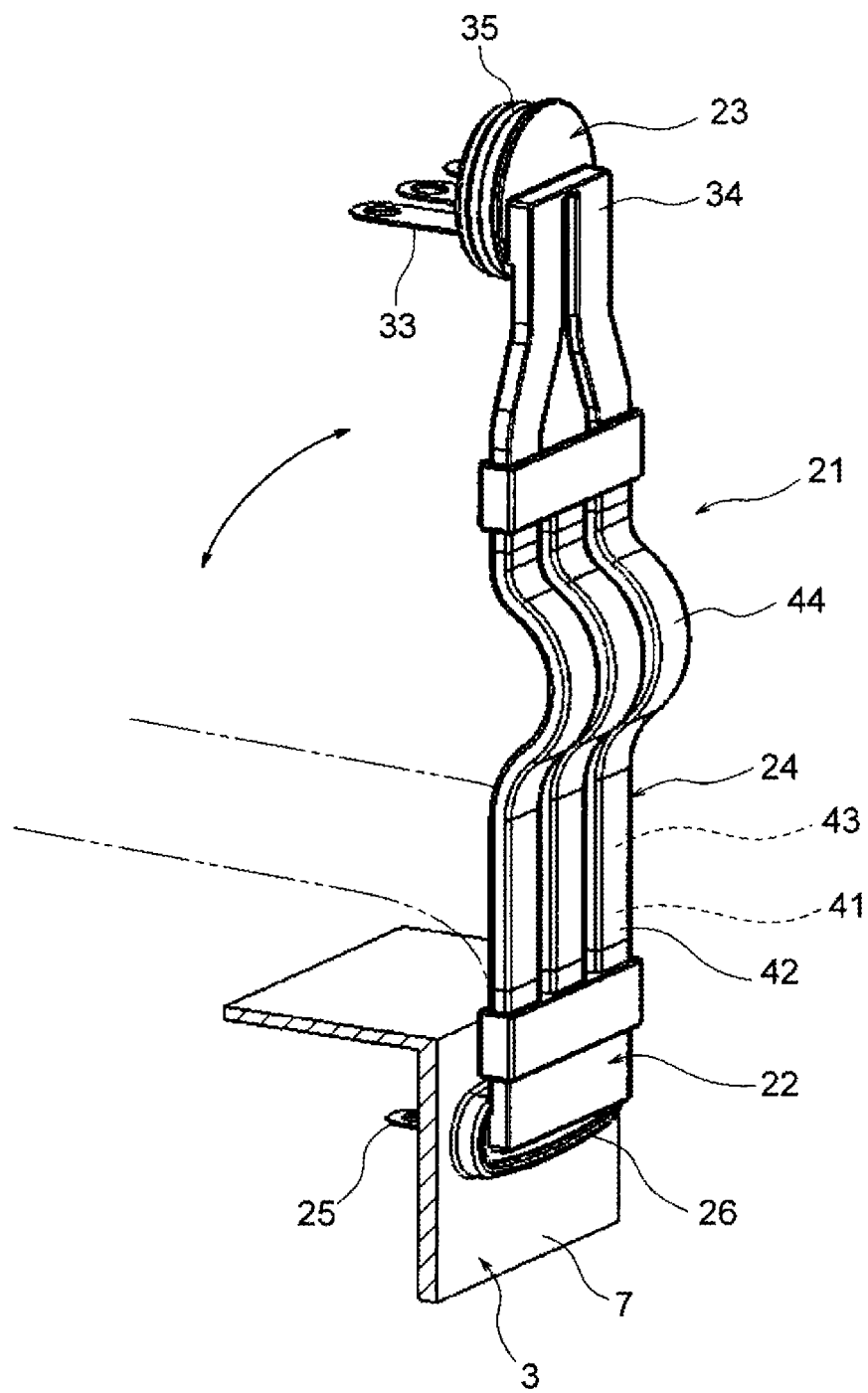
FIG. 9 is a step explanatory diagram according to a method for transporting the wire harness with a device and a method (a first step) for connecting devices with the wire harness according to one embodiment of the invention.

In FIG. 9, after manufacture of the wire harness 21, the wire harness 21 is transported to a motor manufacturing step. In the motor manufacturing step, work in which the wire harness 21 is prepared and the motor side connector 22 of the wire harness 21 is connected to the motor unit 3 is done in an assembly line. At this time, the motor side connector 22 extends through the shield case 7 and electrical connection is made inside the shield case 7.

When the wire harness 21 and the motor unit 3 are together transported to a vehicle assembly step after the wire harness 21 is connected to the motor unit 3, work in which the wire harness 21 is bent and set in a state along the motor unit 3 as shown by an imaginary line is done. Concretely, work in which the wire harness 21 is bent and set in the state along the motor unit 3 in a desired position of the shape holding part 43 is done.

Since the wire harness 21 has plasticity, it is unnecessary for a worker to continue to hold the wire harness 21 by hand and continue subsequent work, and it is also unnecessary to hold the wire harness 21 using a dedicated holding jig. Moreover, the terminal part 33 can be protected simply when the terminal part 33 of the inverter side connector 23 is turned to the side of the motor unit 3 in the case of setting the wire harness 21 in the state along the motor unit 3. Consequently, it is unnecessary to form a dedicated terminal protective member.

Figure 10:
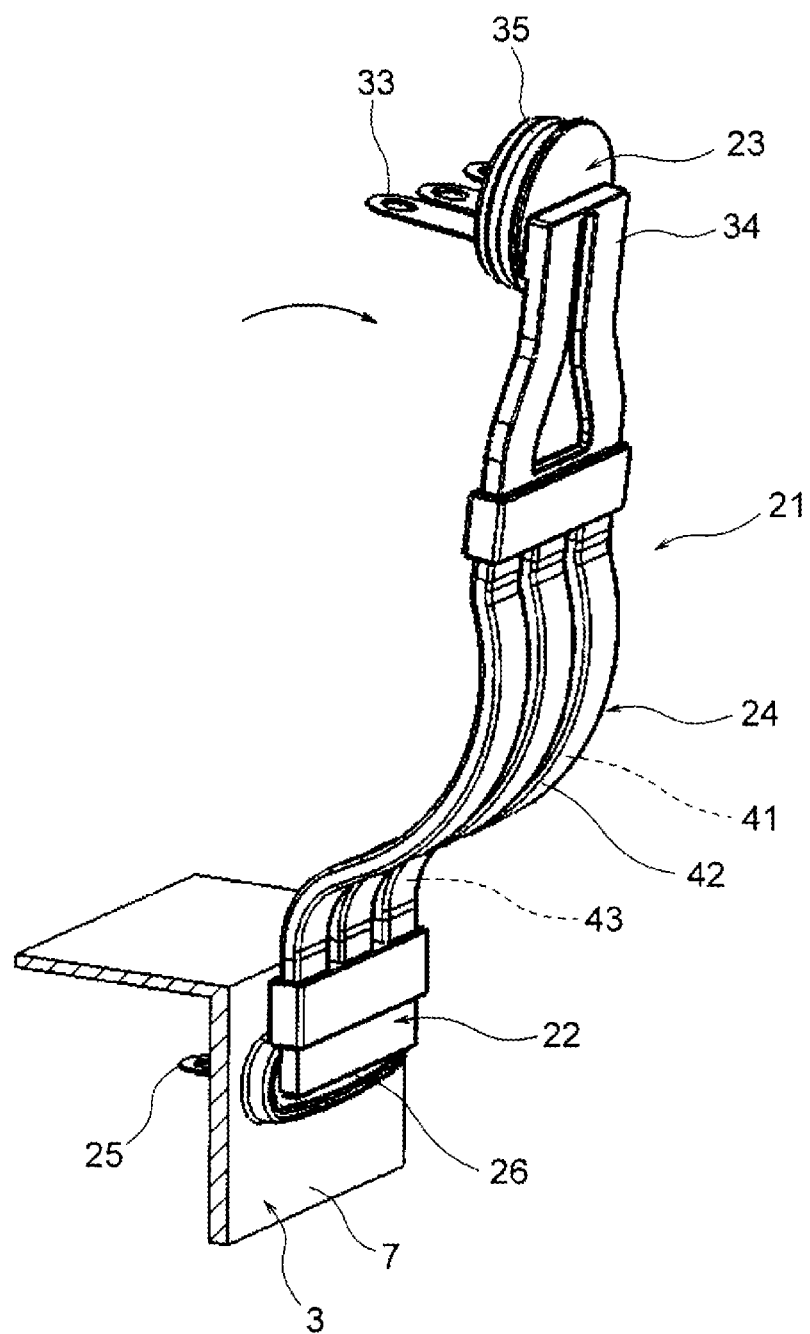
FIG. 10 is a step explanatory diagram according to a method (a second step) for connecting the devices with the wire harness according to one embodiment of the invention.

After the wire harness 21 is transported to the vehicle assembly step together with the motor unit 3, in the vehicle assembly step, work in which the motor unit 3 is installed and fixed to a vehicle is done and also, work in which the wire harness 21 is raised from the state as shown by the imaginary line to a state of a solid line is done. Then, simultaneously with work related to the wire harness 21 or after the work, work in which the inverter side connector 23 of the wire harness 21 is moved in a desired retracted position as shown in FIG. 10 is done. In addition, the reason why the inverter side connector 23 is moved in the desired retracted position is because the inverter unit 4 is installed and fixed in a position corresponding to the motor unit 3 (an obstacle is prevented).

Figure 11:
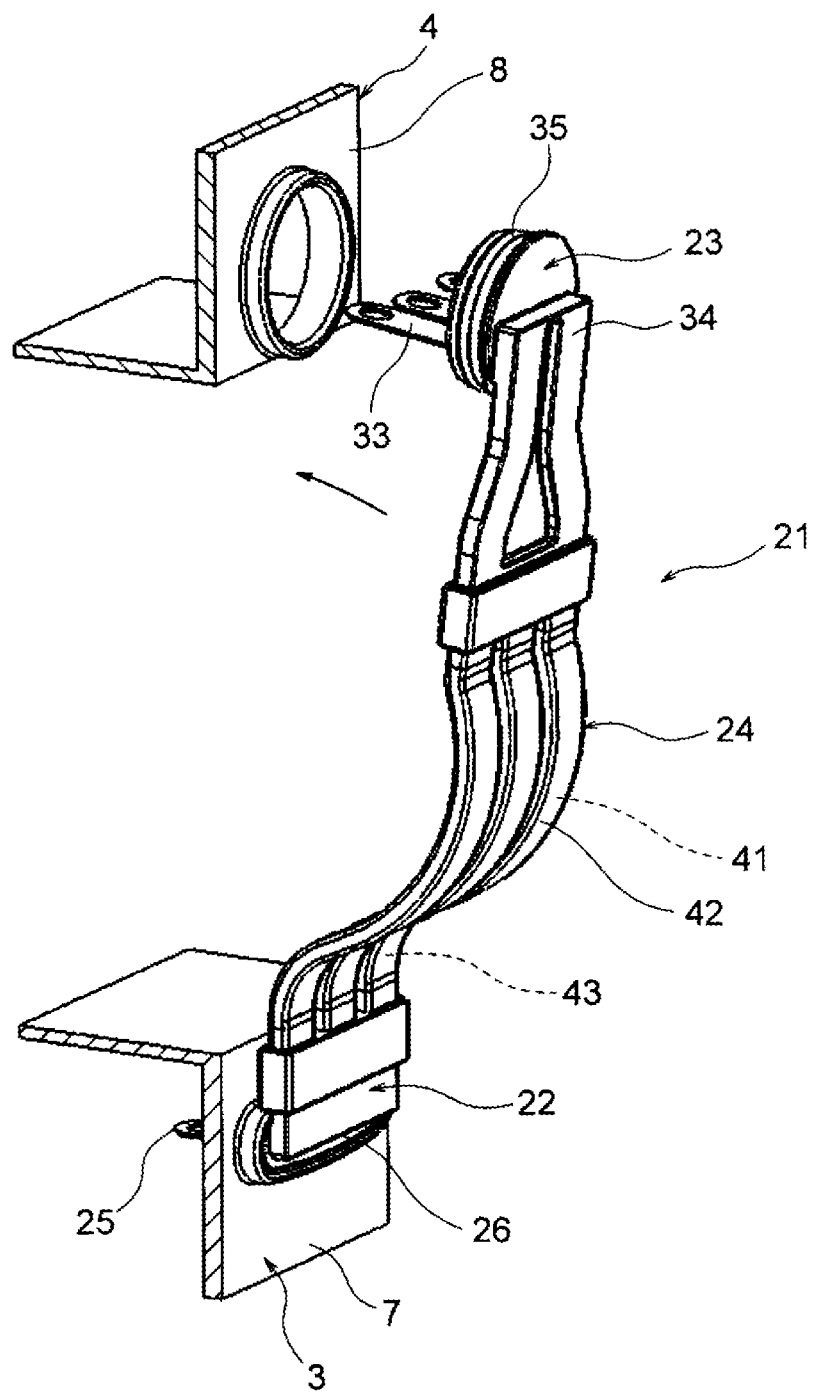
FIG. 11 is a step explanatory diagram according to a method (a third step) for connecting the devices with the wire harness according to one embodiment of the invention.
Figure 12:
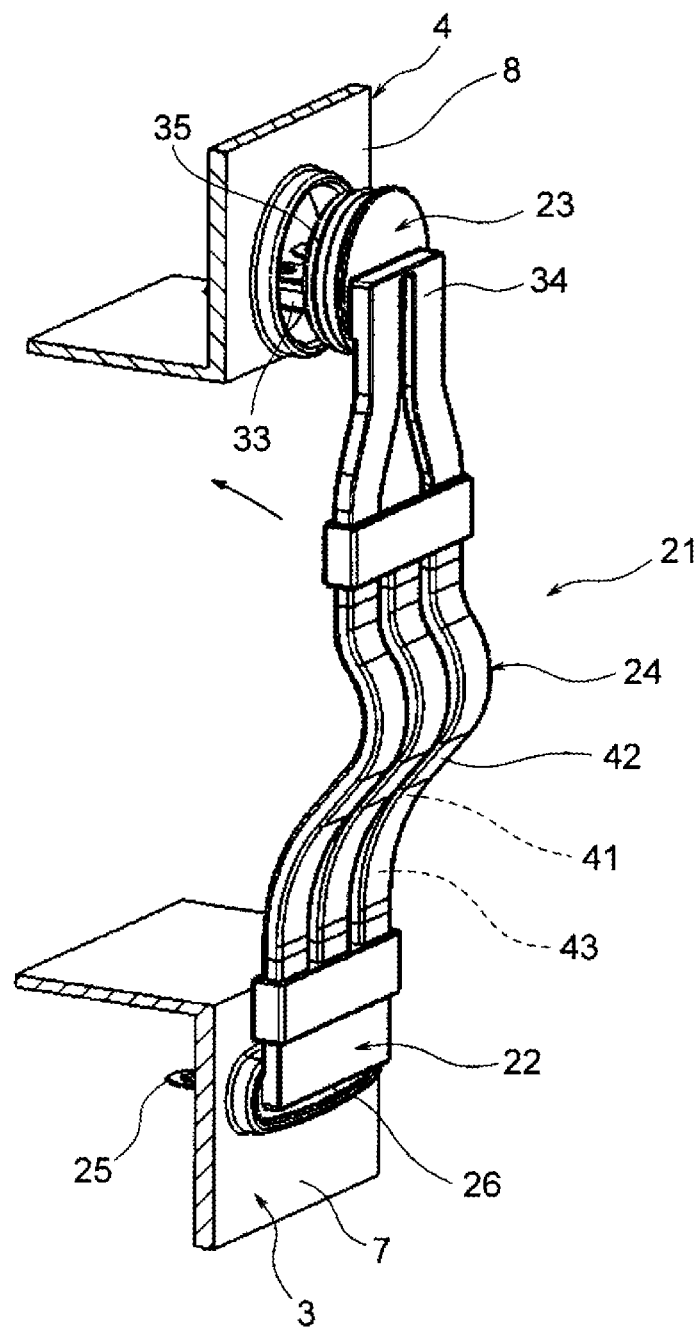
FIG. 12 is a step explanatory diagram according to the method (the third step) for connecting the devices with the wire harness according to one embodiment of the invention.

After the inverter unit 4 is installed, work in which the wire harness 21 is bent and the inverter side connector 23 of the wire harness 21 is moved toward the inverter unit 4 as shown in FIGS. 11 and 12 is done. Then, work in which the inverter side connector 23 is assembled so as to extend through the shield case 8 and electrical connection is made inside the shield case 8 is done as shown in FIGS. 12 and 13, a series of work related to connection, transportation and cabling of the wire harness 21 is completed.

Figure 13:
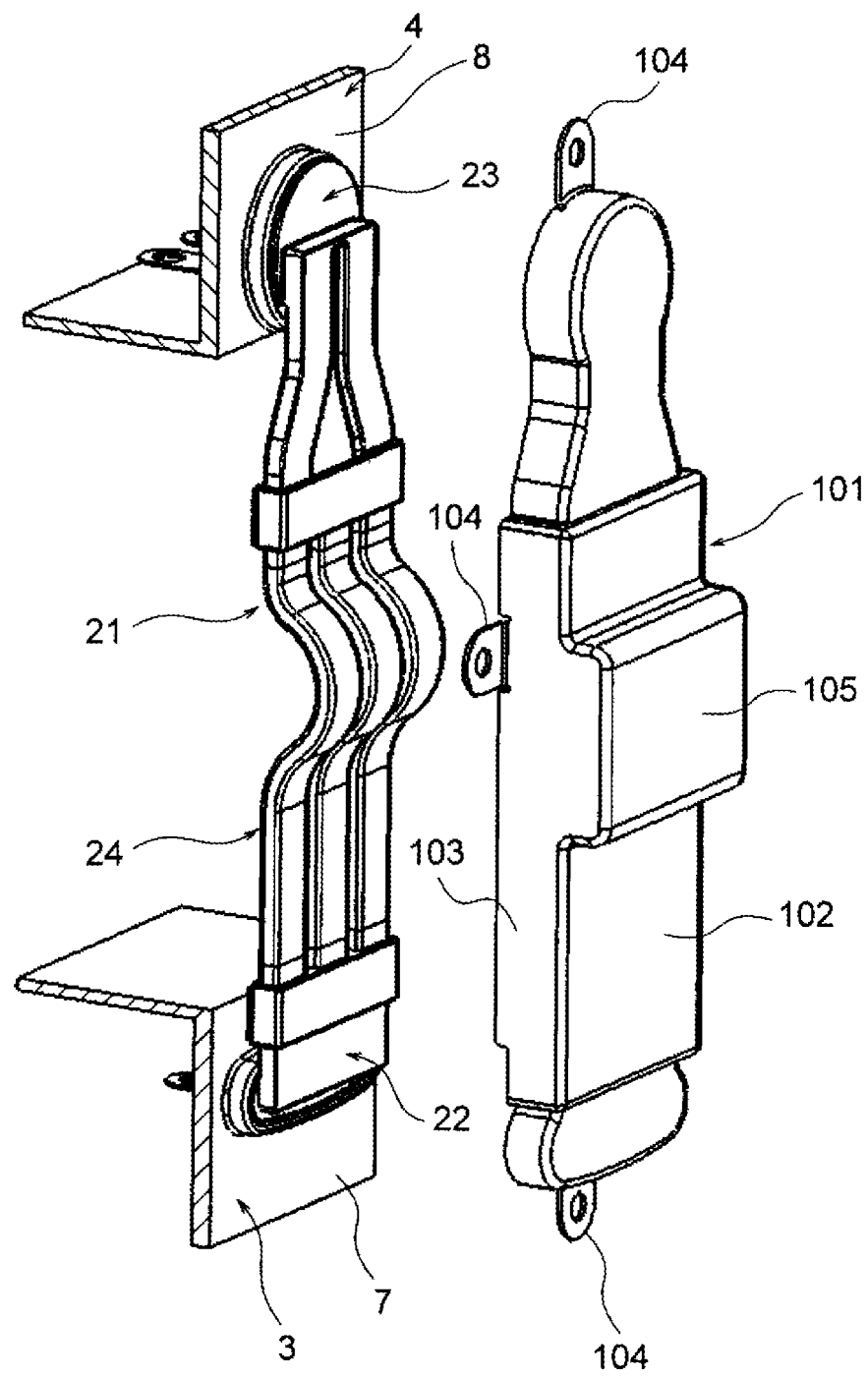
FIG. 13 is a perspective view just before the wire harness is covered with the shield cover after the third step of FIG. 12.
Figure 14:
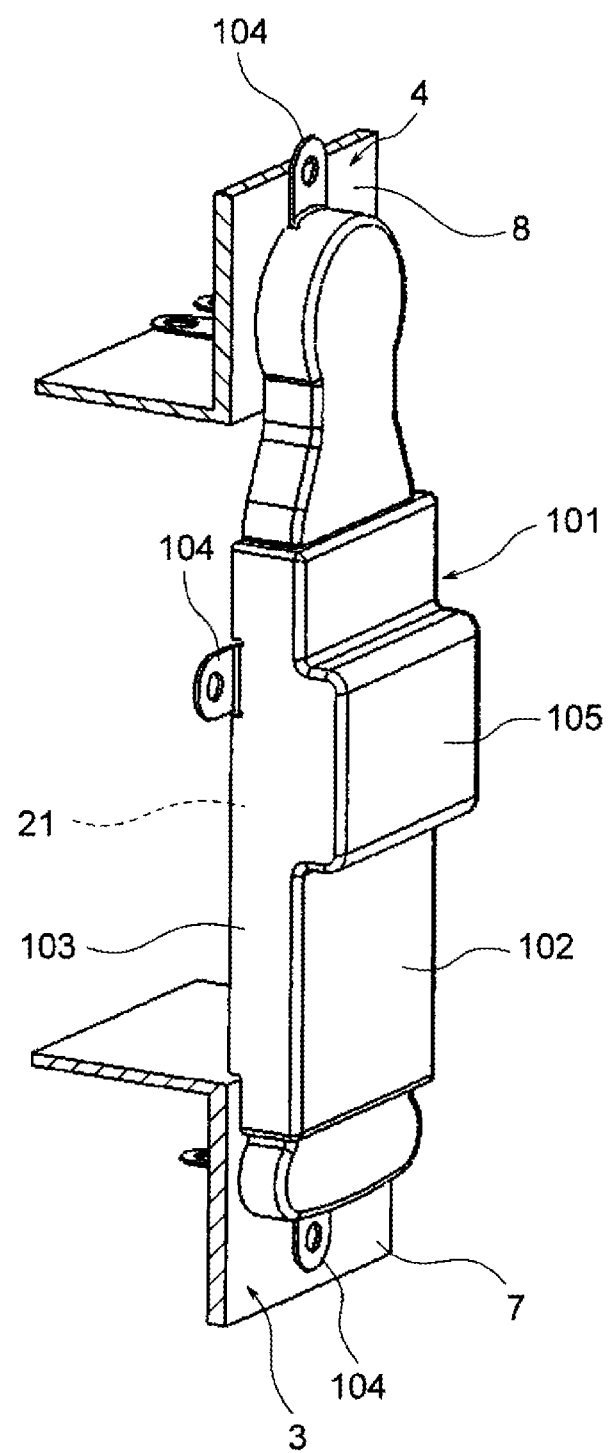
FIG. 14 is a perspective view just after the wire harness of FIG. 13 is completely covered with the shield cover.

Finally, work in which the wire harness 21 is covered with the shield cover 101 and the shield cover 101 is screwed and fixed is done as shown in FIGS. 13 and 14. Accordingly, the wire harness 21 is electromagnetically shielded and is not influenced by noise.

As described above with reference to FIGS. 1 to 14, according to the wire harness 21 of the embodiment, the conductor of the wire harness 21 is constructed of the bus bar 41. Since the shape holding part 43 is formed in the bus bar 41, the bus bar itself 41 can be bent in a position of the shape holding part 43. Since the shape holding part 43 is plastically deformed and holds the shape at a point in time of stopping the bend process, the wire harness 21 can be formed in a desired bend shape. Also, the wire harness 21 having plasticity can be obtained by forming the shape holding part 43 in the bus bar 41. Consequently, there is an effect capable of reducing the number of work man-hours in the case of transportation or connection by such a wire harness 21.

Also, according to the method for transporting the motor unit 3 and the wire harness 21 of the embodiment, the conductor of the wire harness 21 which is connected to the motor unit 3 and is transported together with the motor unit 3 is constructed of the bus bar 41. Since the shape holding part 43 is formed in the bus bar 41, the wire harness 21 having plasticity can be obtained. Consequently, the wire harness 21 could be bent and set in a state along the motor unit 3 in a position of the shape holding part 43 in the case of transportation, and there is an effect capable of stabilizing arrangement of the wire harness 21 without forming a special fixing member. Hence, there is an effect capable of reducing the number of work man-hours in the case of transportation.

Also, according to the method of connection between the motor unit 3 and the inverter unit 4 by the wire harness 21 of the embodiment, the conductor of the wire harness 21 used in connection between the motor unit 3 and the inverter unit 4 is constructed of the bus bar 41. Since the shape holding part 43 is formed in the bus bar 41, the bus bar itself 41 can be bent in a position of the shape holding part 43. Since the shape holding part 43 holds the shape at a point in time of stopping the bend process, the wire harness 21 can be formed in a desired bend shape. Consequently, after the wire harness 21 is connected to the motor unit 3, the wire harness 21 can be bent in a position with no problem in installing the inverter unit 4. Since the wire harness 21 has plasticity, it is unnecessary for a worker to continue to hold the wire harness by hand and do work, or to fix the wire harness for temporary holding, and it is also unnecessary to use a dedicated holding jig. Consequently, there is an effect capable of reducing the number of work man-hours in the case of connection.

In addition, the wire harness of the invention, the method for transporting the wire harness and the device and the method of connection between the devices by the wire harness have been described in detail with reference to the specific embodiment, but the invention is not limited to each embodiment described above and moreover, various changes can naturally be made without departing from the gist of the invention.

In the above explanation, connection between the motor unit 3 and the inverter unit 4 is made by the wire harness 21, but the invention is not limited to this embodiment, and may make connection between the inverter unit 4 and a battery, between the inverter unit 4 and an electrical junction box such as a junction block, or between electrical junction boxes.

Also, the above explanation has the configuration and structure in which the bus bar 41 is included as the conductor of the high-voltage conducting path 24 and also all (or a part) of the bus bar 41 is formed as the shape holding part 43, but the invention is not limited to this embodiment. That is, it may be constructed so that a shape holding part with a form different from the above is included as, for example, a separate component and the shape holding part is arranged along the conducting path and also the shape as the wire harness is held in any bend state by the arranged shape holding part. A concrete use example may be constructed so that, for example, one or plural high-voltage electric wires with a conductor structure made of twisted wires are included and a shape holding part of a linear component made of, for example, aluminum is set in a state along the high-voltage electric wires and then the shape is held in any bend state by the shape holding part (the high-voltage electric wires with a conductor structure made of, for example, twisted wires are used for holding the shape and the linear shape holding part is used subsidiarily). In addition, as setting the shape holding part in the state along the high-voltage electric wires, for example, a method for being fixed to the high-voltage electric wires by a tape wind or a method for being properly arranged so as to form, for example, a spindle (for example, both ends are formed in the motor side connector and the inverter side connector by molding) is given.

The present application is based on Japanese patent application (patent application No. 2010-157450) filed on Jul. 12, 2010, and the contents of the patent application are hereby incorporated by reference.

INDUSTRIAL APPLICABILITY

According to a wire harness according to the invention, a method for transporting the wire harness and a device, and a method of connection between devices by the wire harness, the wire harness capable of reducing the number of work man-hours in the case of transportation or connection, the method for transporting the wire harness and the device, and the method of connection between the devices by the wire harness can be provided.

DESCRIPTION OF REFERENCE NUMERALS AND SIGNS

1 . . . HYBRID VEHICLE
2 . . . ENGINE
3 . . . MOTOR UNIT (DEVICE, FIRST DEVICE)

4 . . . INVERTER UNIT (SECOND DEVICE)
5 . . . ENGINE ROOM
6 . . . WIRE HARNESS
7,8 . . . SHIELD CASE
9 . . . FIXING LEG
21 . . . WIRE HARNESS
22 . . . MOTOR SIDE CONNECTOR (CONNECTION PART)
23 . . . INVERTER SIDE CONNECTOR (CONNECTION PART)
24 . . . HIGH-VOLTAGE CONDUCTING PATH (CONDUCTING PATH)
25,33 . . . TERMINAL PART
26,34 . . . HOUSING PART
27,35 . . . PACKING MEMBER
28,36 . . . TERMINAL BODY
29,37 . . . FOLDED PART
30,38 . . . CONDUCTOR JOINT PART
31,39 . . . HOUSING BODY
32,40 . . . BODY CONTINUOUS PART
41 . . . BUSBAR (CONDUCTOR)
42 . . . COVERING PART (COVER)
43 . . . SHAPE HOLDING PART
44 . . . CURVED PART
45 . . . WELDED PORTION
46 . . . CONDUCTOR
101 . . . SHIELD COVER
102 . . . ROOF WALL
103 . . . SIDE WALL
104 . . . FIXING PART
105 . . . PROTRUSION
106 . . . SCREW HOLE

The invention claimed is:

1. A wire harness comprising:
a plurality of conductors including a plurality of twisted high voltage electric wires, the plurality of conductors having flexibility so as to be bendable and maintain its own shape in any bent state,
wherein:
a current flows through the plurality of conductors;
the plurality of high voltage electric wires being directly connected to each other along a longitudinal path between a first end of the plurality of conductors and a second end of the plurality of conductors; and
a first connector is integrally formed at a position of the first end of the plurality of conductors, and a second connector is integrally formed at a position of the second end of the plurality of conductors.

2. The wire harness according to claim 1, wherein a material of the plurality of conductors is aluminum or aluminum alloy.

3. A method for transporting a wire harness with a device, the wire harness comprising a plurality of conductors including a plurality of twisted high voltage electric wires, the plurality of conductors having flexibility so as to be bendable and maintain its own shape in any bent state, and a current flows through the plurality of conductors when the wire harness is in use, the plurality of high voltage electric wires being directly connected to each other along a longitudinal path between a first end of the plurality of conductors and a second end of the plurality of conductors, and a first connector is integrally formed at a position of the first end of the plurality of conductors, and a second connector is integrally formed at a position of the second end of the plurality of conductors, the method comprising:

a step of arranging the wire harness along the device by bending the plurality of conductors of the wire harness to a desired position in a case of transporting the wire harness and the device to which one end of the wire harness is connected, wherein the wire harness remains in the desired shape during the transport thereof.

4. A method for connecting devices with a wire harness, comprising:
a first step of providing the wire harness, the wire harness comprising a plurality of conductors including a plurality of twisted high voltage electric wires, the plurality of conductors having flexibility so as to be bendable and maintain its own shape in any bent state, and connecting one end of the wire harness to a first device, and a current flows through the plurality of conductors when the wire harness is in use, the plurality of high voltage electric wires being directly connected to each other along a longitudinal path between a first end of the plurality of conductors and a second end of the plurality of conductors, and a first connector is integrally formed at a position of the first end of the plurality of conductors, and a second connector is integrally formed at a position of the second end of the plurality of conductors;
a second step of bending the wire harness in a position of the plurality of high voltage electric wires and moving the other end of the wire harness to a desired retracted position; and
a third step of installing a second device in a position corresponding to the first device, then bending the wire harness in the position of the plurality of high voltage electric wires to move the other end of the wire harness toward the second device, and connecting the other end to the second device.

5. The wire harness according to claim 1, wherein
each of the conductors of the plurality of conductors comprise a first end and a second end, thereby forming the respective first and second ends of the plurality of conductors;
the first ends of the conductors of the plurality of conductors are arranged in substantially the same plane; and
one or more of the second ends of the conductors of the plurality of conductors are disposed in a second plane other than a first plane in which the remainder of the plurality of second ends are disposed.

6. The wire harness according to claim 1, wherein along a longitudinal path between the first end of the plurality of conductors and the second end of the plurality of conductors, the plurality of high voltage electric wires have substantially the same shape.

7. The wire harness according to claim 4, wherein along a longitudinal path between the first end of the plurality of conductors and the second end of the plurality of conductors, the plurality of high voltage electric wires have substantially the same shape.

8. The wire harness according to claim 1, the wire harness further comprising a curved part curved in a semicircular arc shape.

9. The wire harness according to claim 8, wherein the curved part is disposed between the first end of the plurality of conductors and the second end of the plurality of conductors and directly contacts the plurality of conductors.

* * * * *